3,088,239
FISHING POLE WITH LINE RETRACTOR
Horace F. Weaver, R.F.D. 3, Moultrie, Ga.
Filed Apr. 13, 1962, Ser. No. 187,381
7 Claims. (Cl. 43—18)

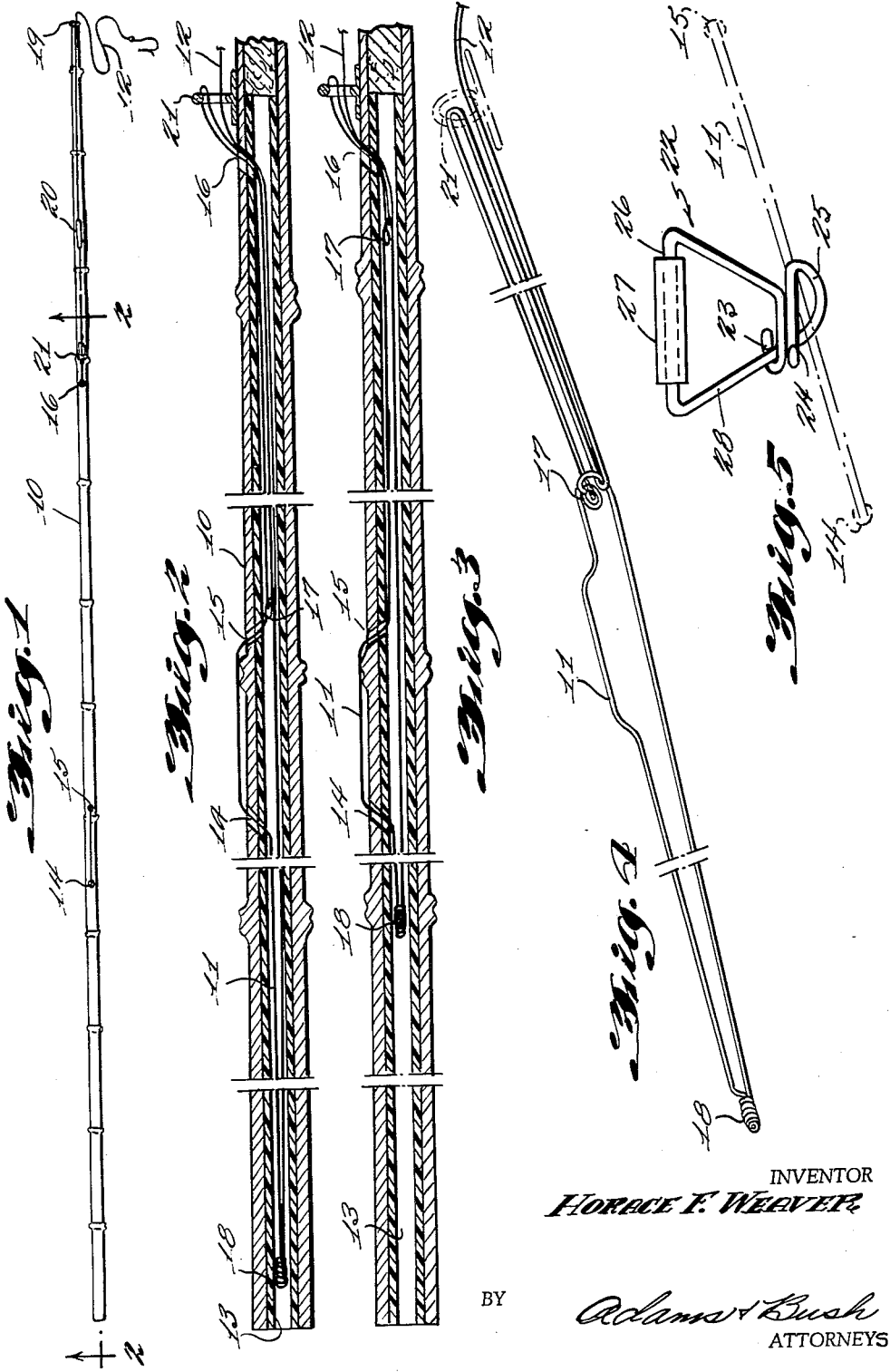

This invention relates to fishing poles and has more particular reference to a fishing pole with a line retractor.

One object of the present invention is to provide a novel and improved fishing pole with a line retractor which easily and quicky permits the fisherman to change the length of the line on his fishing pole.

Another object of the present invention is to provide a novel and improved fishing pole with a line retractor, as a novel and improved fishing pole with a line retractor, as characterized above, which permits the fisherman to install a new line on and in the fishing pole which can easily and quickly be shortened or lengthend.

Another object of the present invention is to provide a fishing pole, as above characterized, in which, when fishing is finished, the line can be easily and quickly retracted into the pole to facilitate carrying the pole without line tangles and involvement with other poles.

A further object of the invention is to provide a fishing pole with a line retractor which is simple, economical in construction, and which is efficient in carrying out the purpose for which it was designed.

Other objects and advantages of the invention will appear in the following description when considered in connection with the accompanying drawings, wherein:

FIG. 1 is a plan view of one embodiment of a fishing pole with a line retractor constructed in accordance with the present invention;

FIG. 2 is an enlarged vertical sectional view, taken on the line 2—2 of FIG. 1, showing the fishing line fully retracted;

FIG. 3 is a view similar to that shown in FIG. 2, but showing the fishing line in extended position;

FIG. 4 is an enlarged perspective view of the fishing line and retracting wire; and FIG. 5 is an enlarged perspective view of a grip member slidably mouned on the section of the retractor wire outside the pole to facilitate pulling the retractor wire rearwardly in the pole.

The present invention provides a novel and improved fishing pole with a line retractor and, in general, comprises a fishing pole having a wire in the form of an elongated loop mounted in a hollow portion of the pole and with a portion of one of the reaches of the wire loop passing in and out of the pole to permit rectilinear movement of the loop by hand and a fishing line attached to the wire loop in such a manner that the line may be shortened or lengthened by hand operation of the wire loop.

The invention further contemplates the use of a grip member to facilitate retraction of the wire loop retractor.

Referring now to the drawings, there is illustrated, in FIGS. 1 to 4, inclusive, one embodiment of a fishing pole with a line retractor constructed in accordance with the present invention. As there shown, a fishing pole 10 has a wire loop 11 mounted in the butt end portion of the pole and connected to a fishing line 12.

The pole 10 may be of any usual type and made of cane, plastic or fiberglass. The butt end portion of the pole must be hollow to receive the wire loop 11. In the particular embodiment of the invention illustrated, a cane pole has been hollowed out for two-thirds of its length from the butt to the tip plus six inches. The cane pole is easily bored through and, preferably, an open-ended plastic tube, as shown at 13, is inserted in the bore. Three openings 14, 15 and 16, are made through the side wall of the cane and plastic tube into the bore of the tube. The sides of these openings may be reinforced by metal grommets or fiberglass, if desired. A portion of the wire loop 11 passes through the openings 14 and 15 and the fishing line 12 enters the bore of the plastic tube through the opening 16.

In order to get the correct ratio of the length of the wire loop 11 and fishing line 12, the hole 16 is positioned adjacent the inner end of the plastic tube so that it will be located approximately two-thirds of the distance from the butt to the pole tip plus six inches.

The wire loop 11 is preferably made of flexible piano wire. The wire is preferably slightly longer than two-thirds of the length of the pole and, in forming the loop 11, one end of the wire is inserted in the hole 15 and brought out at the hole 16. Then, at approximately the half way length of the wire an eye 17 is twisted in the wire and the wire is doubled back and the forward end of it is inserted back in the hole 16. The rear end of the wire is inserted in the hole 14 and the entire wire, as doubled, is pushed backward through the pole bore and out the back end of the pole, where it is clipped to proper length and the two ends suitably secured together as by twisting, as shown at 18, or by welding.

In order to permit the bight and eye 17 to emerge from the pole bore at the hole 16 for loading and reloading the fishing line, the distance between the bight in the retractor wire (when the retractor wire is fully retracted rearward) and the middle of the hole 16 is approximately one inch shorter than the maximum distance the retractor can travel in one direction. The hole 16 is approximately one-quarer inch in diameter to permit the bight and eye 17 in the retractor to emerge from the pole bore for loading and reloading the fishing line.

In installing the fishing line 12, it is run through an eye 19 on the outside of the pole at the tip, then to a clamp 20, when through the wire loop, then through an eye 21 formed on the outside of the pole adjacent the opening 16, then its free end is tied to the eye 17 formed on the upper run of the wire loop 11. When the wire loop 11 is drawn back through the pole (by hand engaging the portion of the wire loop located outside the pole between openings 14 and 15) the fishing line 12 is pulled inside the pole and trippled therein (see FIG. 4). This enables an amount of fishing line to emerge from the pole which is three times as long as the distance traversed by the wire loop 11 when the line is pulled forward to extend it to a normal length of fishing line, fully the length of the pole, to be used and to be retracted. When retracted the major portion of the line is within the pole and there is exposed that portion of the line extending from the opening 16 to the fishing hook at the tip end of the pole. The tail of the wire loop 11 which extends through the butt end of the pole prevents the eye 17 formed on the loop 11 from twisting while the retractor is being operated.

The line clamps 20 may be of any suitable type and provide means for securing the fishing line, particularly when it is extended and being used for fishing.

The operation of the fishing pole and retractor is believed obvious. To operate the fishing pole the fishing line is held at the tip of the pole and pulled to the desired length and then secured with the clamp 20. To shorten the line or retract it into the pole it is released from the clamp and the exposed part of the wire loop (which extends between the holes 14 and 15) is engaged by the fingers and the wire loop is repeatedly slid backward toward the butt of the pole until the fishing line is of the desired length or fully retracted. Then the fishing line is again secured with the clamp 20.

In some instances it may be considered desirable to provide a grip member to facilitate the rearward movement of the retractor wire loop in the pole. One embodiment of such a grip member is illustrated in FIG. 5. As there shown, the grip member comprises a piece of wire bent into a continuous generally triangular shaped loop 22, with one free end 23 of the wire engaging one leg of the triangle and the other free end 24 of the wire bent back on itself to form a loop 25 around the exposed section of the retractor wire 11. The upper horizontal cross bar or leg 26 of the loop 22 may be provided with a plastic grip member 27, as shown.

To operate the wire grip member to move the wire loop 11 rearwardly in the line pole, the grip member is started in the forward position near the opening 15 and pulled downward against the retractor wire loop 11 and backward the full length of the exposed reach of the wire loop, thereby gripping the wire loop and pulling it backward. The gripping or tightening results when the cross bar 26 is pulled downward and backward, thereby pressing the end portions 23 and 24 of the wire grip downward, closing the lower loop 25 around the exposed section of the retractor wire loop 11. In connection with the foregoing, it is pointed out that the end portions 23, 24 of the wire grip member extend behind the vertical leg portion 28 of the triangular loop 22 in order for the pressure created by pulling the cross bar 26 downward and backward to create the correct pressure for the lower loop 25 to grip the retractor wire loop 11.

From the foregoing, it readily will be apparent that there has been provided a novel and improved fishing pole with a line retractor which is simple and economical in construction and one that easily and quickly permits the fisherman to change the length of the line on the fishing pole.

Obviously, the invention is not restricted to the particular embodiment thereof herein shown and described.

What is claimed is:

1. A fishing pole with line retractor comprising a pole having a hollow bore of predetermined length formed in its butt end portion and extending toward the pole tip, and a line receiving hole formed in its side wall and opening into said bore adjacent the forward end thereof; a pair of eyes mounted on said pole, one adjacent the pole tip, the other adjacent the forward end of said bore; an elongated retractor member reciprocably mounted within said bore, said retractor member having a bight and eye formed on its forward end; a fishing line passing through the eye on the pole tip, then entering said hole formed in the pole adjacent the forward end of said bore, then making at least one run between said bight and the eye adjacent the forward end of said bore and then back into said bore with its free end secured to said eye on said retractor member; and means for manually moving said retractor member forwardly and rearwardly in said bore whereby said line will be retracted and extended in a predetermined ratio to the lateral distance moved by said retractor member.

2. Apparatus as set forth in claim 1, wherein said retractor member is in the form of an elongated closed loop of resilient wire and the eye formed on its forward end is integral with said wire.

3. Apparatus as set forth in claim 2, wherein said pole has a spaced-apart pair of holes formed therein and opening into said bore at a predetermined distance from the pole butt and wherein said wire loop has its upper reach passing through said pair of holes to provide a section of the loop adapted to be engaged by the hand of an operator for moving said loop forwardly and rearwardly in said bore.

4. Apparatus as set forth in claim 3, wherein an open-ended tube is inserted within said bore and provided with holes coresponding to the holes in said pole and wherein said rectractor is mounted within said hollow tube.

5. Apparatus as set forth in claim 4, including a clamp for said line mounted on the exterior of said pole between the eyes mounted thereon.

6. Apparatus as set forth in claim 3, including a grip member slidably mounted on the section of said wire loop outside the pole for facilitating the movement of said wire loop rearwardly in said pole.

7. Apparatus as set forth in claim 6, wherein said grip member is in the form of a continuous wire loop loosely looped around the section of the retractable wire loop outside the pole, said grip member being substantially triangular in shape and having a plastic grip member around the upper horizontal leg of the triangle.

No references cited.